June 12, 1928.  1,673,347
M. BICHEROUX
MANUFACTURE OF RAW PLATE GLASS
Original Filed May 13, 1921   3 Sheets-Sheet 2
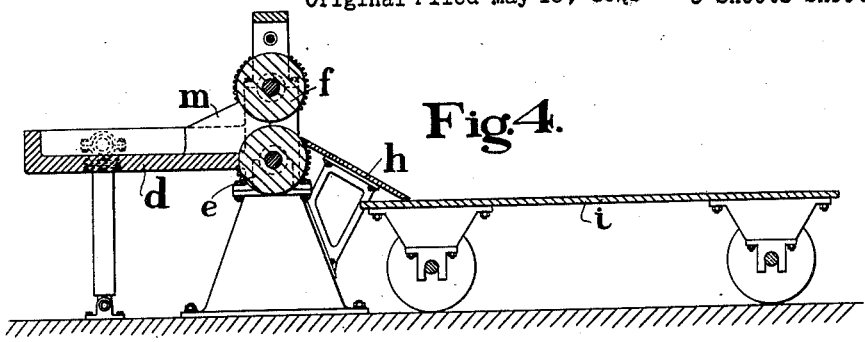
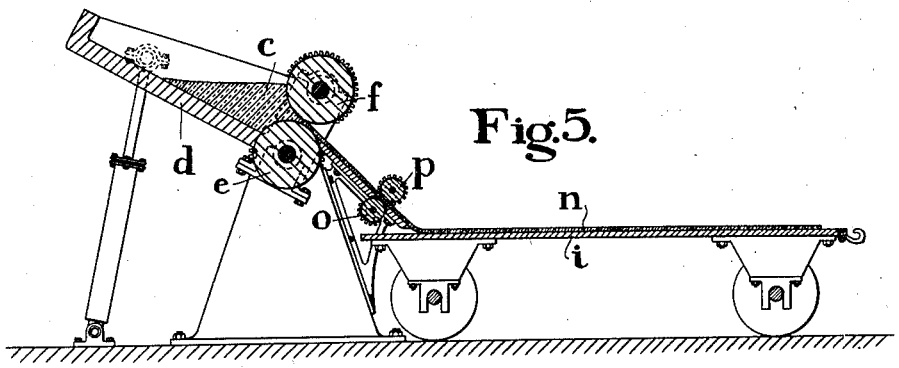
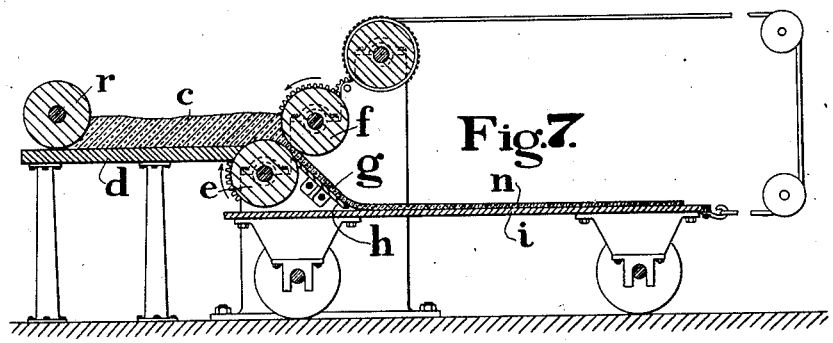
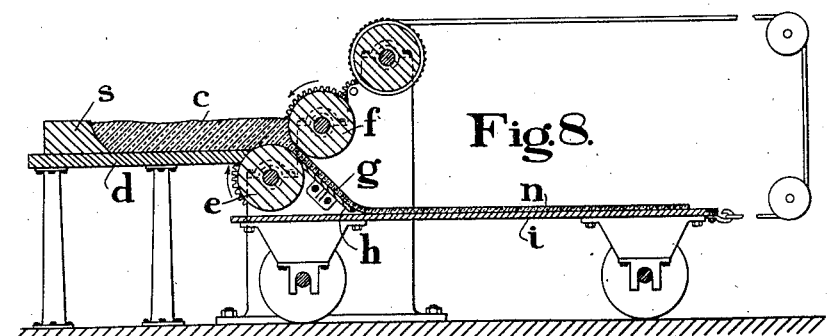

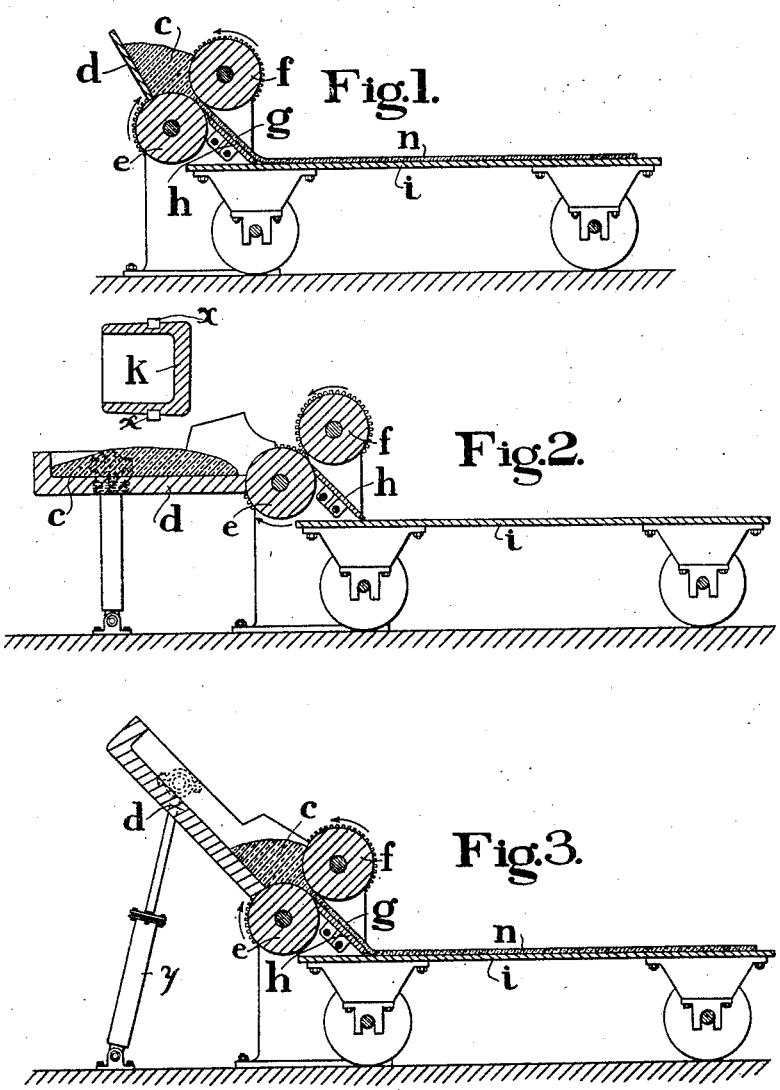

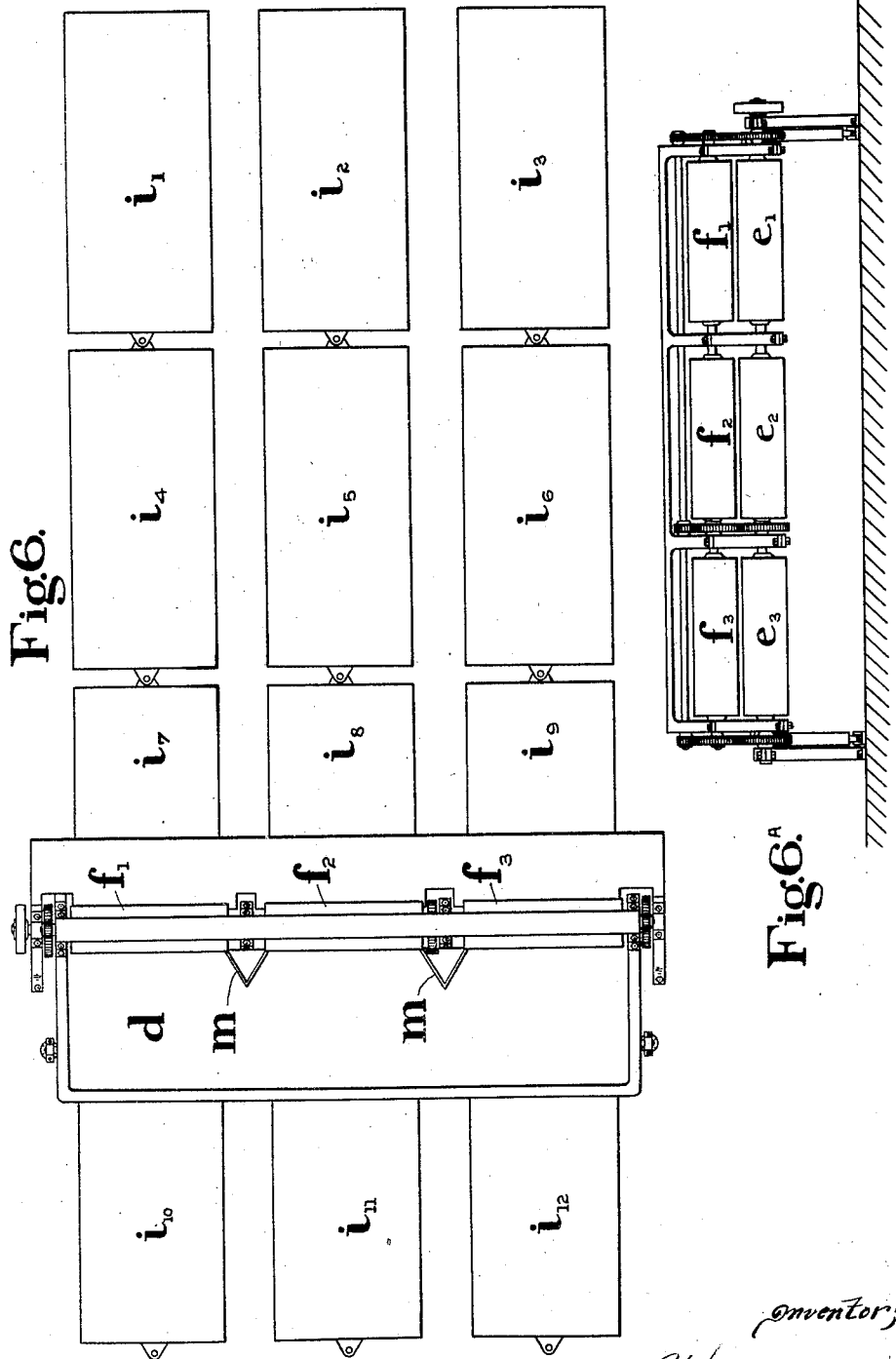

Patented June 12, 1928.

1,673,347

UNITED STATES PATENT OFFICE.

MAX BICHEROUX, OF AIX-LA-CHAPELLE, GERMANY, ASSIGNOR TO MAATSCHAPPIJ TOT BEHEER EN EXPLOITATIE VAN OCTROOIEN, OF AMSTERDAM, NETHERLANDS.

MANUFACTURE OF RAW PLATE GLASS.

Application filed May 13, 1921, Serial No. 469,340, and in Germany November 16, 1918. Renewed December 19, 1927.

This invention relates to a method of and apparatus for manufacturing high grade raw plate glass, which, after grinding and polishing can be used as mirror or other high grade glass.

It is well known in the art that the two principal methods of producing plate glass, namely, the tube blowing method and the table rolling method have advantages peculiar to each, while on the contrary each has certain disadvantages.

Advantages of the former method are the generally good quality of the glass as regards even surface and composition and the possibility of making thin sheets or plates while the disadvantages are insanitary conditions of working, high cost and slow speed of production and limitation in the size of sheet or plate and the limited maximum thickness to about 6 m. m.

An advantage of the latter method is the greater scope with regard to the size of the plate, but the surface is usually uneven and cooling cracks are inevitable and there are serious limitations in the possible thinness of the plate, as any attempts to produce plates thinner than about 8 m. m. soon result in the production of useless material owing to the formation of cooling cracks due to the sudden and undue cooling of the glass on the iron rolling table, a suitable table of non-heat conductive material being impracticable.

In both known methods glass refined in melting pots is used.

While larger pots with consequent greater efficiency or economy in heating can be used in the table rolling method the whole content of a pot is tipped in bulk onto the table, and it spreads immediately along the table—usually for over a length of about 2 m.—so that there is a premature cooling of the glass and consequent solidification, and moreover, as a greater quantity of this partly cooled glass has to be forced forward by the roller at the beginning of the rolling operation, the maximum rolling pressure and most intimate pressure contact with the table occurs at the beginning. In practice the head of the plate is consequently useless owing to the numerous cooling cracks in that portion, which portion with a thickness of about 10 to 12 m. m. usually extends for about 2 m. in the direction of rolling.

There is also no uniform constitution in plate glass produced by the rolling table method and it can only be considered as of second grade quality.

The object of the present invention is to retain the advantages of the two older methods while avoiding the disadvantages of either, in other words it is desired to produce raw plate glass of high grade, economically and rapidly, without limitation as to size and thickness of plate, without cooling cracks and with an even surface. The new method is not to be confused with the known method of producing window glass or other low grade glass, mostly used for roofing purposes, where the transparency may be somewhat obscured, and which glass, if squeezed between rollers, is not ground nor polished.

The invention will be more readily understood from the following description made with reference to the accompanying drawings, and the novelty of the invention will be pointed out in the appended claims.

In the drawings:—

Figure 1 is a sectional side elevation of one form of apparatus according to the invention.

Figures 2 and 3 are sectional side elevations of another form of apparatus with the parts in positions occupied at different stages in the rolling operation.

Figures 4 and 5 being similar views illustrating modifications of this form of the apparatus.

Figure 6 is a plan indicating the manner in which a division of the glass mass into separate effluents may be effected, prior to or practically simultaneously with the rolling.

Fig. 6ᴬ shows the rollers of Fig. 6, looking from the right hand.

Figures 7 and 8 are sectional side elevations illustrating alternative modes of assisting the feeding of the glass mass to the rollers so as to maintain the mass formation.

In one mode of carrying out the invention the whole refined content of a melting pot is discharged in bulk or thick lump form into a receiver which, as indicated in Figure 1, is in the form of an open, glass-supporting receiver $d$ wherein the mass is held as a lump by walls on three sides and coacting rollers *e*, *f*, on the fourth side. Obviously, from the time the mass leaves the melting pot, it is not mixed, stirred, nor rolled over, and hence no air bubbles are formed and imprisoned. The glass is held in the hopper *d* in mass formation, that is it cannot spread out into a thin layer and consequently thereis a comparatively small surface area minimizing any chance of pollution, and the heat is well retained until the end of the rolling operation. The glass is at once passed between the rollers *e*, *f*, and there is a very slight pressure surface, namely intimate contact between the glass and rollers while under pressure. Moreover as the hot glass is drawn from the soft core of the mass, i. e. from within the outer surface or skin of the mass, and (in contradistinction to the old table rolling method wherein the roller has to press forward the excess glass which is stiff as it is subject to solidification) there is but a small quantity between the rollers at any moment, a much lighter rolling pressure is necessary with a consequent minimum intimate contact. Further the slight intimate contact and light pressure had such a slight effect on the surface of the glass that immediately the strip emerges from the rollers there is instant equalization of heat with the inner hotter core so that perfectly flat and smooth plates are produced in comparison with the bubbled and wavy plates produced on rolling tables. The rollers *e*, *f*, can be set at any desired distance apart to suit the thickness of the plate required.

The strip *g* of glass emerging from the rollers *e*, *f*, need make no further contact with metal as it is allowed to glide down a chute *h* onto a transport truck *i* to lie flat as a plate *n*, the truck being made of non-heat conductive material as the truck merely supports the weight of the plate *n*, there being no rolling operation on the truck, as in the table rolling method, so that metal in its construction is no longer a necessity. The chute *h* is obviously not merely a guide since it supports from below every part of the sheet the instant the rollers cease to compress it, and hence gravity has no distorting effect at any point.

The truck *i* moves relatively to the rolling mechanism, for example a number of trucks *i* may follow one another in succession according to the capacity of the melting pot or size of the glass mass *c* and thickness of the plates produced. The strip *g* may be cut into small plates, immediately after rolling, for instance so that one plate lies on each truck, or the cutting may be effected in other ways well known in the art.

The trucks *i*, transport the plates *n* to the lehr or annealing oven.

The trucks *i* are preferably in positive driving connection with the rollers *e*, *f* and have a slight acceleration rather than a lag.

In another mode of carrying out the invention the whole defined glass content *c*, of a melting pot *k*, Figure 2, is discharged by means of a fork *x* in bulk into a receiver *d* adapted to lie initially in a substantially horizontal position. Immediately the pot *k* is removed the receiver *d* is gradually tilted by means of a lifting device *y* about the axis of the roller *e* so that the glass, still retained in mass formation is gradually moved or fed towards the rollers *e*, *f* which roll it into a strip *g* which passes down a chute *h* to form flat clear glass plates *n* which are received and transported by a series of trucks *i* as above described. Figure 3 indicates the position of the receiver towards the end of a rolling operation.

During the whole operation the glass *c* is maintained in mass formation with a minimum of surface area and consequently reduction to a minimum of any liability to pollution.

In Figures 4 and 5 the receiver *d* is indicated as being rigid with the side frames which support the rollers *e*, *f* so that the receiver and the frames can be pivoted together for example about the axis of the roller *e*.

In the form of apparatus illustrated in Figure 5 auxiliary rollers *o*, *p* are provided to straighten, impress, emboss or otherwise act on the glass strip if such be desired.

As the efficiency of heating glass in pots and therefore economy increases with the size of pot it may be desirable to use pots so large with charges of about 1500 to 2000 kg., that it may be difficult to tilt the receiver. Moreover if thick glass be required the charge may be of stiffer quality and not so easily moved by gravitation.

In such a case a substantially horizontal receiver *d* may be provided with auxiliary means for imparting motion to the glass mass towards the rollers *e*, *f*, for instance by pushing or pulling the mass. In Figures 7 and 8 two forms of auxiliary mass moving means are indicated, a roller *r* being shown in Figure 7 and a reciprocatory pusher *s* in Figure 8. The receiver *d* may also be inclined or movable into an inclined position.

With large pots or heavy charges necessitating a great total width of roller, for instance about 5 m. mechanical difficulties may arise. In order to avoid these difficulties it is preferred to use a plurality of pairs of comparatively short rollers and to divide the glass mass into effluents, each of which is passed to a pair of rollers.

For example the receiver *d* is provided with partitions *m* similar to the cut-waters or ice breakers provided on the buttresses of bridge piers. The partitions *m* are provided in front of and at the adjacent parts of a plurality of pairs of rollers such as $e_1$, $f_1$, $e_2$ $f_2$, $e_3$ $f_3$, Figure 6, so that the glass mass as it moves towards the rollers is divided into effluents by the partitions $m$ without disturbance and each effluent passes between its respective pair of rollers and is rolled into a separate strip. Each strip is received by a series of transporting trucks, for instance three series of four trucks each $i_1$, $i_4$, $i_7$, $i_{10}$; $i_2$, $i_5$, $i_8$, $i_{11}$; and $i_3$, $i_6$, $i_9$, $i_{12}$; namely twelve in all are indicated in Figure 6, each truck being for example about 6 m. long and each strip about 1 m. wide and about 24 m. long. The strips can be cut in known manner so that one plate lies on each truck.

An advantage of the above arrangement is that strips of different thickness or kind can be produced simultaneously although in any case the thickness or kind can be varied even during rolling operations by adjusting the rollers relatively to one another.

In the form of apparatus shown in Figure 4 the partitions $m$ are always held with a tight fit with the rollers $e$, $f$.

I wish it to be understood that I do not desire to be limited to the exact details of construction shown and described, for many obvious modifications will occur to a person skilled in the art.

In my pending application Serial No. 147,549, which is filed as a continuation in part thereof, I claim the pouring of the glass from the pot to the receiving table and the general construction of the mechanism herein shown. The claims of this application are directed and restricted to processes and apparatus in which the glass is divided into a plurality of streams before passing into the forming means. Claims not so directed and restricted, but reading on other features of the method or construction here shown, are made by me, and reserved for my aforesaid application Serial No. 147,549, and in my other application filed June 11, 1927, serially numbered 198,260.

I claim:

1. The method of manufacturing raw plate glass adapted to be ground and polished, consisting in quickly discharging in bulk the molten and refined glass contained in a plate glass melting pot, causing the glass to be divided in several juxtaposed portions and subjecting each portion to treatment adapted to convert it into a plate.

2. The method of manufacturing raw plate glass adapted to be ground and polished, consisting in quickly discharging in bulk the molten and refined glass contained in a plate glass melting pot, causing the glass to be divided in several juxtaposed portions and causing each portion to pass through between revolving surfaces so as to be converted into a plate.

3. The method of manufacturing raw plate glass adapted to be ground and polished, consisting in quickly discharging in bulk the molten and refined glass contained in a plate glass melting pot, moving said glass so as to place and cause it to move at an angle to the horizontal, causing the moving glass to be divided in several juxtaposed portions and subjecting each portion to treatment adapted to convert it into a plate.

4. The method of manufacturing raw plate glass adapted to be ground and polished, consisting in quickly discharging in bulk the molten and refined glass contained in a plate glass melting pot, moving said glass so as to place and cause it to move at an angle to the horizontal, causing the moving glass to be divided in several juxtaposed portions and causing each portion to pass through between revolving surfaces so as to be converted into a plate.

5. The method of manufacturing raw plate glass, adapted to be ground and polished, consisting in quickly discharging in bulk the molten and refined glass contained in a plate glass melting pot, causing the glass to be divided in several juxtaposed portions, causing each portion to pass through between revolving surfaces so as to be converted into a plate and cutting said plate, while still in plastic condition.

6. Apparatus for manufacturing raw plate glass adapted to be ground and polished, comprising a plate glass pot, a pair of rolls, means for tilting said pot so as to quickly discharge its whole contents in front of said rolls and means for dividing the glass discharged from said pot into several juxtaposed portions.

7. Apparatus for manufacturing raw plate glass adapted to be ground and polished, comprising a plate glass pot, a pair of rolls, means for tilting said pot so as to quickly discharge its whole contents in front of said rolls and means in front of and in close proximity to said rolls for dividing the glass discharged from said pot into several juxtaposed portions.

8. Apparatus for manufacturing raw plate glass adapted to be ground and polished, comprising a plate glass pot, a receiver adapted to hold all the molten glass contained in said pot, means for tilting said pot so as to quickly discharge its whole contents onto said receiver, a pair of rolls adjoining said receiver and means on said receiver in front of said rolls for dividing the glass discharged from said pot into several juxtaposed portions.

9. Apparatus for manufacturing raw plate glass adapted to be ground and polished, comprising a plate glass pot, a receiver adapted to hold all the molten glass contained in said pot, means for tilting said pot so as to quickly discharge its whole contents onto said receiver, a pair of rolls adjoining said receiver, means for varying the angular position of said receiver and means on said receiver in front of said rolls for dividing the glass discharged from said pot into several juxtaposed portions.

10. Apparatus for manufacturing raw plate glass adapted to be ground and polished, comprising a plate glass pot, several juxtaposed pairs of rolls, a receiver extending in front of and across all said pairs of rolls, means for tilting said pot so as to quickly discharge its whole contents onto said receiver and means on said receiver in front of said pairs of rolls for dividing the glass discharged from said pot into a number of juxtaposed portions equalling the number of pairs of rolls.

11. Apparatus for manufacturing raw plate glass adapted to be ground and polished, comprising a plate glass pot, several juxtaposed pairs of rolls, a receiver extending in front of and across all said pairs of rolls, means for tilting said pot so as to quickly discharge its whole contents onto said receiver, means on said receiver in front of said pairs of rolls for dividing the glass discharged from said pot into a number of juxtaposed portions equalling the number of pairs of rolls and means for varying the angular position of said receiver.

12. Apparatus for manufacturing raw plate glass adapted to be ground and polished, comprising a plate glass pot, a pair of rolls, means for tilting said pot so as to quickly discharge its whole contents in front of said rolls, means for dividing the glass discharged from said pot into several juxtaposed portions and a number of juxtaposed plane supports, equalling the number of such portions, horizontally movable relatively to said rolls.

13. Apparatus for manufacturing raw plate glass adapted to be ground and polished, comprising a plate glass pot, several juxtaposed pairs of rolls, a receiver extending in front of and across all said pairs of rolls, means for tilting said pot so as to quickly discharge its whole contents onto said receiver, means on said receiver in front of said pairs of rolls for dividing the glass discharged from said pot into a number of juxtaposed portions equalling the number of pairs of rolls and a plane support horizontally movable relatively to said rolls.

14. Apparatus for manufacturing raw plate glass adapted to be ground and polished, comprising a plate glass pot, several juxtaposed pairs of rolls, a receiver extending in front of and across all said pairs of rolls, means for tilting said pot so as to quickly discharge its whole contents onto said receiver, means on said receiver in front of said pairs of rolls for dividing the glass discharged from said pot into a number of juxtaposed portions equalling the number of pairs of rolls, and a number of juxtaposed plane supports, equalling the number of pairs of rolls, horizontally movable relatively to said rolls.

15. The method which comprises feeding glass towards a sheet forming means and dividing laterally into a plurality of streams, the glass so fed prior to its contacting with the said means.

16. The method which comprises creating from a common supply a plurality of streams of glass and feeding such streams in parallel paths through sheet forming means.

In testimony whereof I have signed my name to this specification.

MAX BICHEROUX.